US008171275B2

(12) United States Patent
Crowder, Jr. et al.

(10) Patent No.: US 8,171,275 B2
(45) Date of Patent: May 1, 2012

(54) ROM BIOS BASED TRUSTED ENCRYPTED OPERATING SYSTEM

(75) Inventors: Robert W. Crowder, Jr., Las Vegas, NV (US); Ronald A. Cadima, Las Vegas, NV (US); Anthony E. Green, Henderson, NV (US); Thomas E. Buckeyne, N. Las Vegas, NV (US); Pravinkumar Patel, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 957 days.

(21) Appl. No.: 12/014,037

(22) Filed: Jan. 14, 2008

(65) Prior Publication Data

US 2008/0172557 A1 Jul. 17, 2008

Related U.S. Application Data

(60) Provisional application No. 60/885,046, filed on Jan. 16, 2007.

(51) Int. Cl.
G06F 9/00 (2006.01)
(52) U.S. Cl. ............ 713/2; 713/156; 713/187; 713/189; 726/5; 380/277; 380/281; 709/220
(58) Field of Classification Search .............. 713/2, 156, 713/187, 189; 709/220; 726/5; 380/277, 380/281
See application file for complete search history.

(56) References Cited

U.S. PATENT DOCUMENTS

| | | | | |
|---|---|---|---|---|
| 4,278,837 | A * | 7/1981 | Best ............................... | 713/190 |
| 6,011,849 | A | 1/2000 | Orrin | |
| 6,149,522 | A * | 11/2000 | Alcorn et al. .................... | 463/29 |
| 7,108,605 | B2 | 9/2006 | LeMay et al. | |
| 7,533,185 | B2 * | 5/2009 | Koide et al. .................... | 709/238 |
| 7,565,553 | B2 * | 7/2009 | Hunter et al. ................... | 713/192 |
| 7,810,133 | B2 * | 10/2010 | Carter et al. ....................... | 726/2 |
| 2003/0174840 | A1 * | 9/2003 | Bogan ........................... | 380/277 |
| 2003/0203755 | A1 * | 10/2003 | Jackson .......................... | 463/42 |
| 2005/0129243 | A1 | 6/2005 | Bousis | |
| 2005/0273858 | A1 * | 12/2005 | Zadok et al. .................... | 726/24 |
| 2006/0253702 | A1 * | 11/2006 | Lowell et al. ................. | 713/156 |
| 2008/0028235 | A1 * | 1/2008 | Smith et al. .................... | 713/190 |
| 2008/0254850 | A1 * | 10/2008 | Sylla ............................... | 463/16 |

FOREIGN PATENT DOCUMENTS

| | | |
|---|---|---|
| EP | 1273996 A | 1/2003 |
| WO | 2006/082994 A | 8/2006 |
| WO | 2006/116871 A | 11/2006 |

* cited by examiner

Primary Examiner — Carl Colin
Assistant Examiner — Mohammad Siddiqi
(74) Attorney, Agent, or Firm — Steptoe & Johnson LLP

(57) ABSTRACT

There is disclosed a device, system, and method for a ROM BIOS based trusted encrypted operating system for use in a gaming environment. The gaming device includes a ROM storing a BIOS, a secure loader, an encrypted operating system, and a decryption key for decrypting the encrypted operating system. The decryption key is partitioned and scattered about the secure loader. The method includes initializing the BIOS, locating the decryption key, decrypting the encrypted operating system with the encryption key, verifying a plurality of check codes, and transferring control to the operating system. The check codes are verified responsive to decrypting the encrypted operating system. The check codes are dispersed about the operating system and are unrelated to the operating system. Control is transferred to the operating system responsive to verifying the check codes.

10 Claims, 6 Drawing Sheets

ROM BIOS BASED TRUSTED ENCRYPTED OPERATING SYSTEM

CROSS-REFERENCE TO RELATED APPLICATIONS

This application claims the benefit of U.S. Provisional Application No. 60/885,046, filed on Jan. 16, 2007, which is herein incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

The gaming industry has long embraced electronic gaming devices, wherein the gaming devices are computer based and apply cryptographic techniques for security. Electronic gaming devices are machines that provide for wagering games such as poker, blackjack, and other games of chance, skill, or combinations therein. Currently, gaming devices are produced in many forms including stand-ups, tabletop machines, handheld units, gaming integrated with mobile phones, software plug ins such as a java applet, and many other types of gaming devices.

Computer based gaming devices typically have a processor, a memory, and a storage device. The processor is the component of a system that performs the basic operations of the system including processing of data, exchange of data with memory and peripherals, and management of the system's other components. The memory is a computing component to and from which data and/or executable code can be written to and extracted from.

In order to ensure reliable results, the gaming industry has implemented a variety of security measures, some employing cryptography. Cryptography is the art of preparing or reading messages in a form intended to prevent their being read by those not privy to secrets of the form. Cryptography is practiced broadly in a wide array of applications, including computer security, healthcare information security, banking information security, military communications, mathematics, intellectual property, and many others.

SUMMARY

Briefly, and in general terms, disclosed herein are devices, systems, and methods for a ROM BIOS based trusted encrypted operating system. In one embodiment, there is a gaming device having a ROM. The ROM stores a BIOS, a secure loader, an encrypted operating system, and a decryption key associated with the encrypted operating system. More specifically, the decryption key is partitioned and scattered about the secure loader.

In another embodiment, there is a ROM including a single memory device. The single memory device stores a BIOS, a ciphertext of an operating system, a secure loader, and a key for decrypting the ciphertext. In particular, the key is steganographically hidden on the single memory device about the ciphertext.

In yet another embodiment, there is a method of verifying an operating system of a gaming device. The method includes initializing a BIOS, locating a decryption key, decrypting an operating system with the decryption key, verifying a plurality of check codes, and transferring control to the operating system. A first ROM of the gaming device stores the BIOS, the secure loader, and the decryption key. In this embodiment, the decryption key is stored in scattered portions about the secure loader. Additionally, the check codes are verified responsive to decrypting the encrypted operating system. Moreover, the check codes are dispersed about the operating system and are unrelated to the operating system. Finally, control is transferred to the operating system responsive to verifying the check codes.

Other features and advantages will become apparent from the following detailed description, taken in conjunction with the accompanying drawings, which illustrate by way of example, the features of the various embodiments.

DETAILED DESCRIPTION

Figure 1:
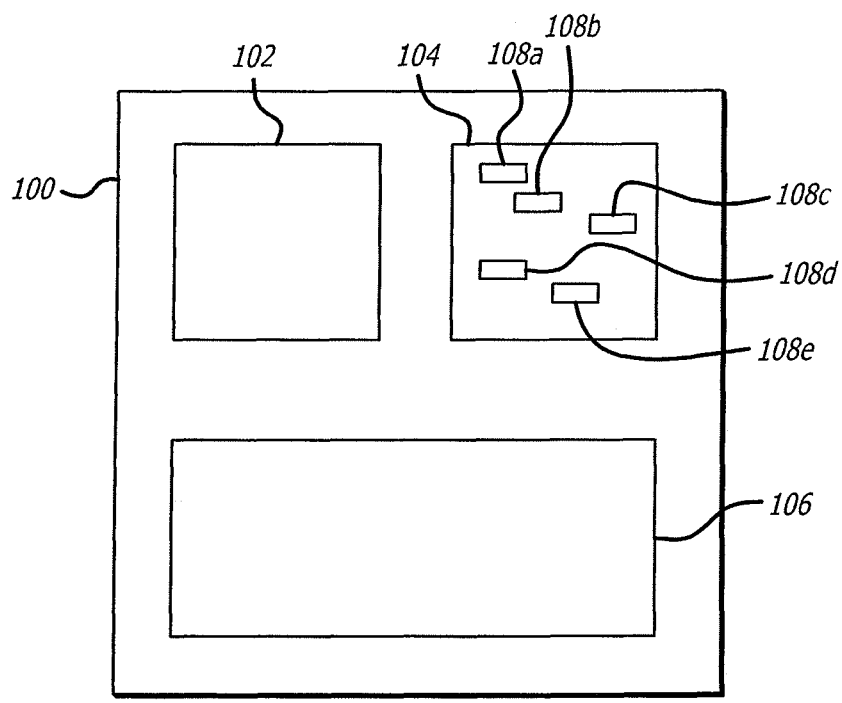
FIG. 1 is a diagrammatic representation of one embodiment of a ROM BIOS based trusted encrypted operating system, wherein a decryption key is partitioned and scattered about a secure loader.

Referring now to the drawings, wherein like reference numerals denote like or corresponding parts throughout the drawings and, more particularly to FIGS. 1-5, there are shown various embodiments of a ROM (Read-Only Memory) BIOS (Basic Input/Output System) based trusted encrypted operating system. In particular, FIG. 1 shows a ROM 100 of a gaming device (not shown).

The ROM 100 is a memory that can be read and not modified. ROMs, typically, are less susceptible to malicious attack than RAMs (Random Access Memory), hard disks, and optical disks. Susceptibility is minimized because ROMs are non-volatile and are protected from write modification. Accordingly, gaming programs and related data which implement rules, characteristics, and personality of wagering games are commonly stored on ROMs. Examples of ROMs include PROMs (Programmable Read Only Memory), EPROMs (Erasable Programmable Read Only Memory), and EEPROMs (Electrically Erasable Programmable Read Only Memory). Further, a ROM which include a BIOS is sometimes referred to as a ROM BIOS.

A ROM BIOS is the first memory accessed upon bootup or restart. Additionally, ROM BIOSes are resistant to software attacks by malicious code because they are non-volatile and read-only devices. In this regard, a ROM BIOS is considered to function as the root of trust of a system and is intrinsically trusted. The term root of trust refers to a device and/or software that functions properly in all instances. In one embodiment, intrinsic trust of the ROM BIOS contents can be established externally in accordance with gaming regulations. Thus, the ROM BIOS does not need to be authenticated by another device each time a system is started.

The ROM 100 stores a BIOS 102, a secure loader 104, and an operating system 106. The BIOS 102 (Basic Input/Output System) is a set of programs, typically initiated at start-up, which enables communication among hardware components such as disks, memories, keyboards, and displays. In one embodiment, the BIOS 102 selects a portion of RAM (not shown) and copies itself and the secure loader 104 to the RAM. From the RAM, a processor executes the BIOS 102 to initiate operation of a motherboard (not shown). In another embodiment, the BIOS 102 is an open source BIOS. In yet another embodiment, the BIOS 102 is commercially purchased BIOS. Once running, the BIOS 102 transfers control to the secure loader 104.

The secure loader 104, loadable by the BIOS 102, is a utility that loads a program into memory and verifies the integrity of the program prior to transferring control to the program. Additionally, the secure loader 104 prevents other computing devices from accessing information stored on the gaming device. Further, the secure loader 104 has responsibility for loading, verifying, and authenticating the operating system 106. The operating system 106 is a set of programs that controls the usage of the computer's hardware and file systems. In one embodiment, the operating system 106 is a Bally Alpha 59000 operating system for performing gaming-related functions.

As used in this application, "authentication" is the application techniques to establish trustworthiness of any one or combination of (a) the source of a message, (b) non-repudiation of the source of the message, and (c) integrity of the message. Messages, such as operating system programs and gaming software can be transferred from a ROM to a RAM as well as many other routes in and/or between standalone and/or networked electronic devices.

Authentication techniques include bit to bit comparisons of information stored on the ROM against known trusted information (e.g., a Kobatron technique) as well as comparisons of a hash of a trusted information to a hash of the copy of the information. In addition, hashes, plaintexts, and ciphertexts can be encrypted and/or digitally signed to provide for enhanced security.

A ciphertext is an encrypted form of a file or program. The corresponding readable form of the file or program is known as a plaintext. In general, a ciphertext is unreadable by anyone who does not have an associated password or key and know the algorithm for decrypting the ciphertext into the plaintext. Many authentication techniques, including hashing and bit to bit comparisons, have become mature. Although certain hash algorithms have proved to be reliably secure, hackers may attempt to circumvent such security by taking control of an operating system prior to the running of a cryptography application.

By configuring a gaming system such that the BIOS 102, the secure loader 104, and the operating system 106 are stored on the same ROM 100, the secure loader 104 and the operating system 106 can be placed at the same root level of trust as the BIOS 102. In particular, control of the gaming system can be passed from the BIOS 102 to the secure loader 104 and then to the operating system 106 without executing code that is stored on other higher risk memory devices.

Frequently, gaming systems are configured with the operating system 106 stored on a hard disk (not shown) or a flash memory module that is connected to a motherboard. In those embodiments, it can be relatively easy for an attacker to swap out the hard disk or the flash module. Moreover, hard disks and flash modules can be susceptible to modification via a network or a wireless device. Should a hacker successfully modify odds for a particular game, the hacker could win jackpots at a much higher frequency than a gaming establishment may allow for.

In order to protect the financial interests of gaming establishments, the operating system 106 is stored in the ROM 100, wherein the ROM 100 is at the root level of trust. Further, the ROM 100 is soldered to a circuit card and coupled to other components via a network of bus lines, thereby presenting at least a physical challenge to hacker. In one embodiment, the circuit card is a computer motherboard such as is found incorporated in a Bally Alpha 59000. By storing the BIOS 102 and the operating system 106 in a ROM 100, the integrity of the gaming machine upon which the ROM 100 will be installed can be protected by testing and certifying the content of the ROM 100 in advance of assembly. The BIOS 102 may further be tested once installed on a motherboard and prior to assembly inside a gaming machine.

In one embodiment, as an additional measure of security, the operating system 106 of FIG. 1 is encrypted. A variety of responsible techniques may be used to encrypt and decrypt the operating system 106. In one embodiment, the operating system 106 can be encrypted with AES-256 (Advanced Encryption Standard using a 256 bit symmetric key). A key is a set of characters or files which provides details for encrypting a plaintext or decrypting a ciphertext. In another embodiment, the operating system 106 can be password protected with a 512 bit password, wherein the password is generated based on a hash function. A password is an alphanumeric string required for access to a particular file, application and/or system. The key and/or the password can be further protected using a public key encryption scheme.

As shown in FIG. 1, the decryption key 108 is stored with the secure loader 104. As such, the secure loader 104 can load the encrypted operating system 106 from the ROM 100 to RAM and cause the processor (not shown) to decrypt the encrypted operating system 106. However, in order to conceal the decryption key 108, the decryption key 108 is partitioned and scattered about the secure loader 104. The term partition refers to splitting a file or program into two or more separate parts. Moreover, the term scatter refers to randomly distributing parts of a file or program. For example, the decryption key 108 shown in FIG. 1 is partitioned into parts 108a, 108b, 108c, 108d, 108e and stored in noncontiguous sections about the secure loader 104. The term noncontiguous refers to portions of data or files that are not immediately preceding or following each other.

More particularly, the number and size of key partitions 108a, 108b, 108c, 108d, 108e are determined prior to or at the time of compiling the secure loader 104. The location of the key partitions or fragments can be arbitrary, random, or predetermined based on particular logic or a formula. For example, one partition can be located before executable code, one fragment after executable code, and various fragments after each of a plurality of text constants. Moreover, the locations of the key partitions 108a, 108b, 108c, 108d, 108e can be hard coded. These locations are determined at the link/locate steps of a software build process. Further, the executable code of the secure loader 104 will include directions to locate the key partitions or fragments. However, because the secure loader 104 is stored in the ROM in compiled form, determining the location of partitions of the decryption key is not easy to the casual observer or user.

Figure 2:
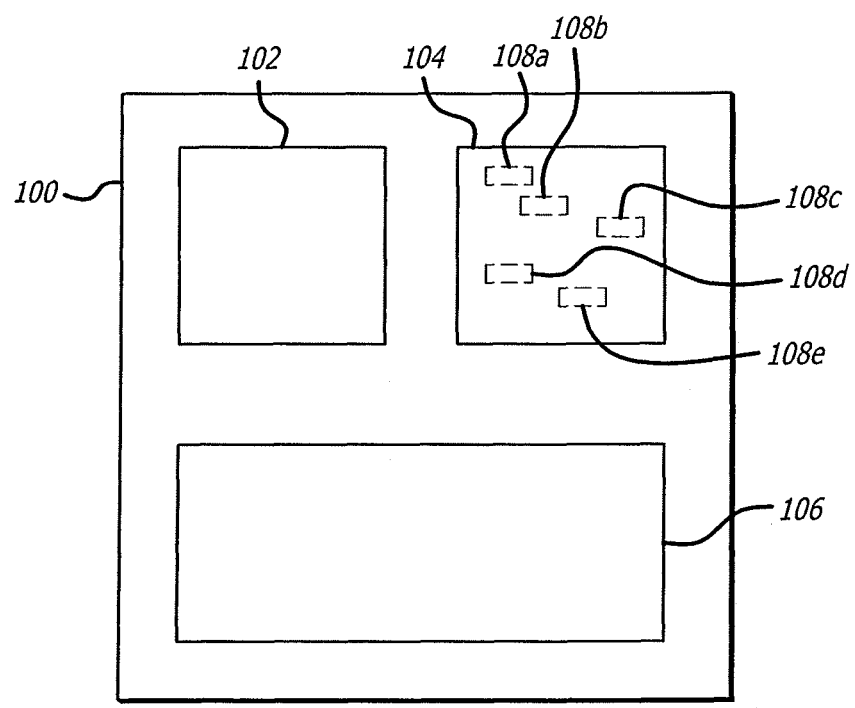
FIG. 2 is a diagrammatic representation of another embodiment of a ROM BIOS based trusted encrypted operating system, wherein a decryption key is steganographically hidden.

In another embodiment, as shown in FIG. 2, the partitioned scattered portions of the decryption key 108a, 108b, 108c, 108d, 108e can be steganographically hidden among the secure loader 104. Steganography is the practice of hiding a file or program within another file or program such that an attacker is not able to determine the existence of the hidden file or program. For example, a document that is steganographically hidden among an operating system would not be listed in an accessible directory for the operating system 106.

In order for the secure loader 104 to steganographically hide the decryption key 108, the secure loader 104 has access to a key or password for locating the scattered partitioned decryption key 108a, 108b, 108c, 108d, 108e. More particularly, the key or password allows the secure loader 104 to locate a header (not shown) of the decryption key 108. The header can identify an inode map for the scattered partitioned portions of the decryption key 108a, 108b, 108c, 108d, 108e. As applied, if the content of the ROM 100 is intercepted or accessed in its entirety, the attacker would be unable to decrypt the encrypted operating system 106. This is because the decryption key 108 would appear not to exist on the ROM 100.

Figure 3:
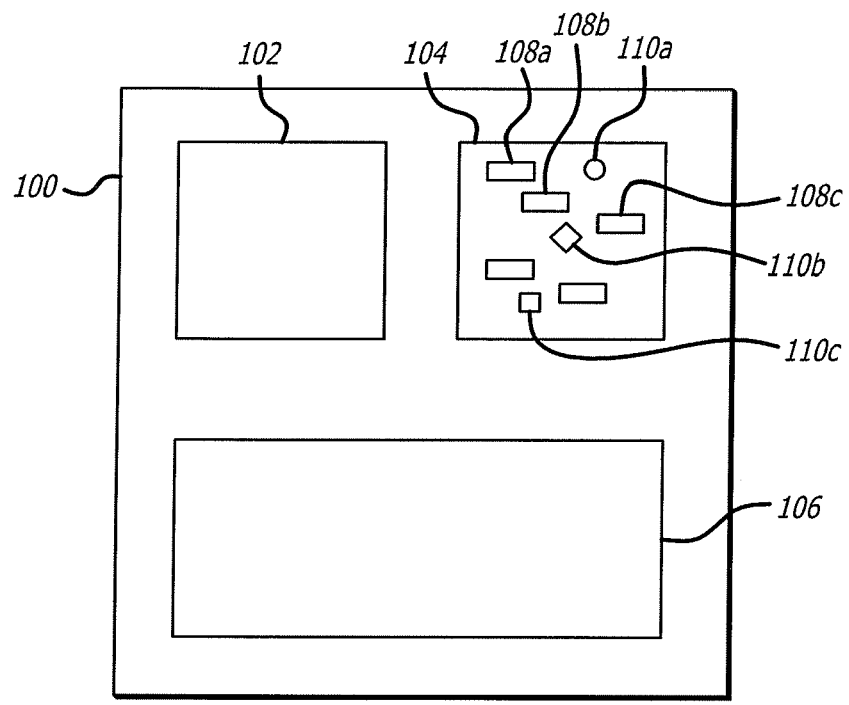
FIG. 3 is a diagrammatic representation of another embodiment of a ROM BIOS based trusted encrypted operating system, wherein check codes are stored about a secure loader.

Referring now to FIG. 3, there is shown an embodiment of a ROM BIOS based trusted encrypted operating system. In the embodiment of FIG. 3, the secure loader 104 stores a plurality of check codes 110a, 110b, 110c dispersed about the secure loader 104. A check code is a set of characters included with a file or program which can be verified to determine integrity of the file or program. Verification refers to checking the integrity of a file or program, typically by comparison of some data with a known data.

In one embodiment, known trusted values of the check codes 110a, 110b, 110c are stored with the BIOS 102. In other embodiments, the known check codes 110a, 110b, 110c can be stored in another memory device (not shown), on another machine (not shown), or with another entity such as a gaming regulation agency. Further, verification using the check codes 110a, 110b, 110c provides for a faster, more efficient verification in comparison to traditional bit to bit comparisons of all data in a memory device in comparison to hash based techniques.

As applied, the plurality of check codes 110a, 110b, 110c are used to verify an installation of the ROM 100 in the gaming system, data integrity of the BIOS 102, a copying of the secure loader 104 to RAM (not shown), or other periodic or on-demand verification. For instance, the plurality of check codes 110a, 110b, 110c dispersed about the secure loader 104 can be assembled into a predetermined phrase, password, or encryption key.

In another embodiment, the check codes 110a, 110b, 110c are independent of each other. By using the check codes 110a, 110b, 110c rather than or in addition to hashes, security can be enhanced as an attacker may be searching solely for hashes. Further, the check codes 110a, 110b, 110c can be configured as unrelated to any other data stored on the ROM 100. As such, the plurality of check codes 110a, 110b, 110c appear as random data, not data employed in a security model.

Figure 4:
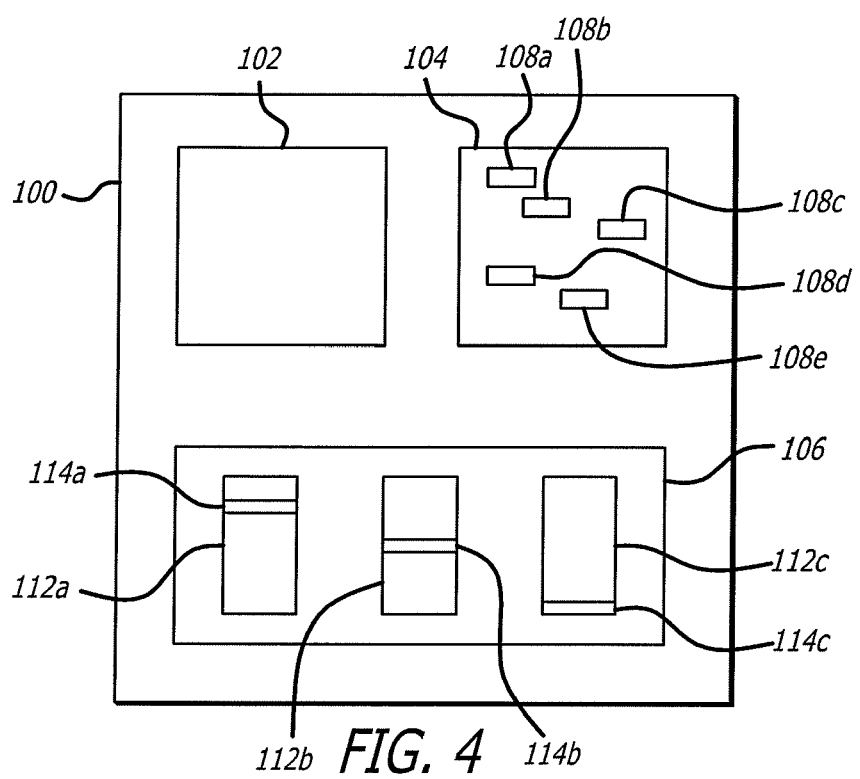
FIG. 4 is a diagrammatic representation of another embodiment of a ROM BIOS based trusted encrypted operating system, wherein check codes are stored about software modules.

Referring now to FIG. 4, there is shown another embodiment of a ROM BIOS based trusted encrypted operating system. In the embodiment of FIG. 4, the operating system 106 includes a plurality of software modules 112a, 112b, 112c. A software module is a routine in a computer program or system that relates to a particular function. For example, the software module 112a is a library module, the software module 112b is an asset content module, and the software module 112c is a configuration data module.

To further enhance security, the operating system 106 includes a plurality of check codes 114a, 114b, 114c dispersed about the plurality of software modules 112a, 112b, 112c. The plurality of check codes 114a, 114b, 114c are used to verify accurate copying of the encrypted operating system 106 to RAM (not shown), accurate decryption of the encrypted operating system 106, or other periodic or on-demand verification. In one embodiment, the check codes 114a, 114b, 114c can be configured as unrelated to the software modules 112a, 112b, 112c. In such a configuration, the check codes 114a, 114b, 114c and the software modules 112a, 112b, 112c would have no apparent or actual relationship. As such, attackers would find it computationally difficult to determine the significance of the check codes 114a, 114b, 114c.

Figure 5:
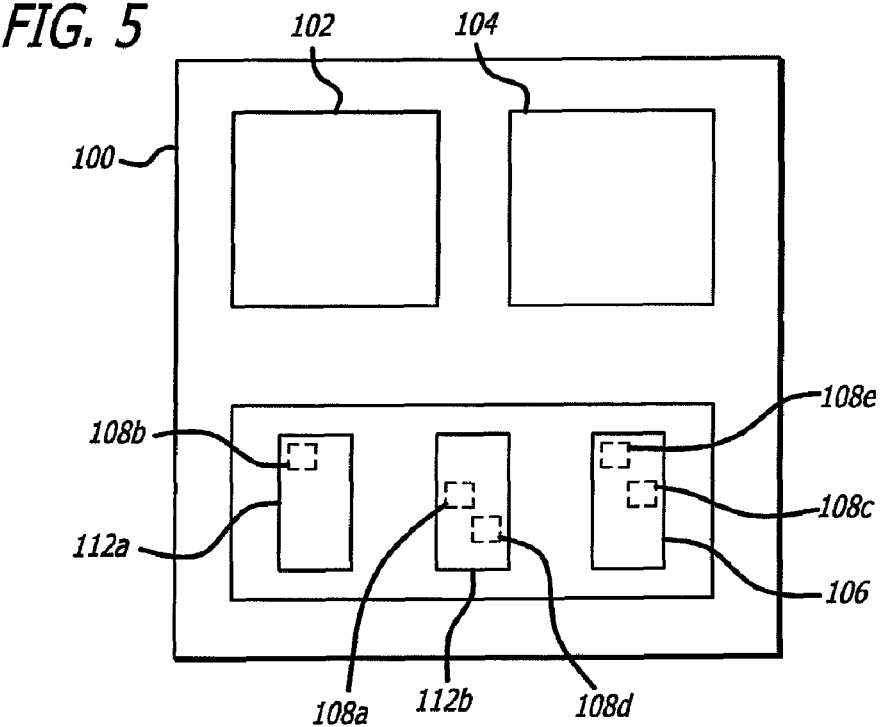
FIG. 5 is a diagrammatic representation of another embodiment of a ROM BIOS based trusted encrypted operating system, wherein a decryption key is steganographically hidden about the encrypted operating system.

Referring now to FIG. 5, there is shown another embodiment of a ROM BIOS based trusted encrypted operating system. In the embodiment of FIG. 5, the decryption key 108a, 108b, 108c, 108d, 108e is steganographically hidden about the operating system 106. To the common attacker, the operating system 106 would not appear to be storing the decryption key 108 at all.

In an alternate embodiment (not shown), the steganographically hidden decryption key 108 can be used to decrypt a steganographically hidden first operating system stored about an encrypted second operating system. Thus, if an attacker successfully modified the second operating system, the attack may be thwarted as the second operating system is merely a decoy and is not actually run. In this embodiment, it is the first operating system that is used if and only if it can be located and verified.

In yet another embodiment, the encrypted operating system 106 steganographically hiding its own decryption key 108 would be able to be stored on a secondary platform (not shown), which may include an EPROM, a CD-ROM (Compact Disc Read Only Memory), a flash memory, or a hard disk. In this regard, even though the encrypted operating system 106 is not on the ROM BIOS 100, the owner of the encrypted operating system 106 would have a sense of security based on the premise that the steganographically hidden decryption key 108a, 108b, 108c, 108d, 108e appears not to exist.

An alternative strategy includes the operating system 106 residing on the secondary platform memory in an encrypted form. The secure loader 104 may decrypt the operating system 106 from the secondary platform memory and load the operating system 106 into RAM. In order to enhance security, a plurality of check codes 114a, 114b, 114c can be verified.

In the embodiment including the secondary platform, the secondary platform may include a gaming platform common libraries module with a signature, a gaming platform common asset content with a signature, a gaming platform configuration data module with a signature, and additional storage space to perform download buffering. Further, the secondary platform may include a game memory including a game executable module with a signature, a game asset content module with a signature, and image, sound, video modules, and a game configuration data module with a signature. Each of the modules on the secondary platform may be executable by the operating system 106. Further, the signatures may be verified for authentication purposes.

It may be appreciated that a gaming machine may be connected to a plurality of gaming machines and/or a central computer via a network. However, the gaming machine may also function as a stand alone device. Additional features which may be achieved by connecting a gaming machine via a network to a central computer include loading new software onto the gaming machine, reconfiguring the gaming machine, monitoring play, and providing system based incentives.

Figure 6:
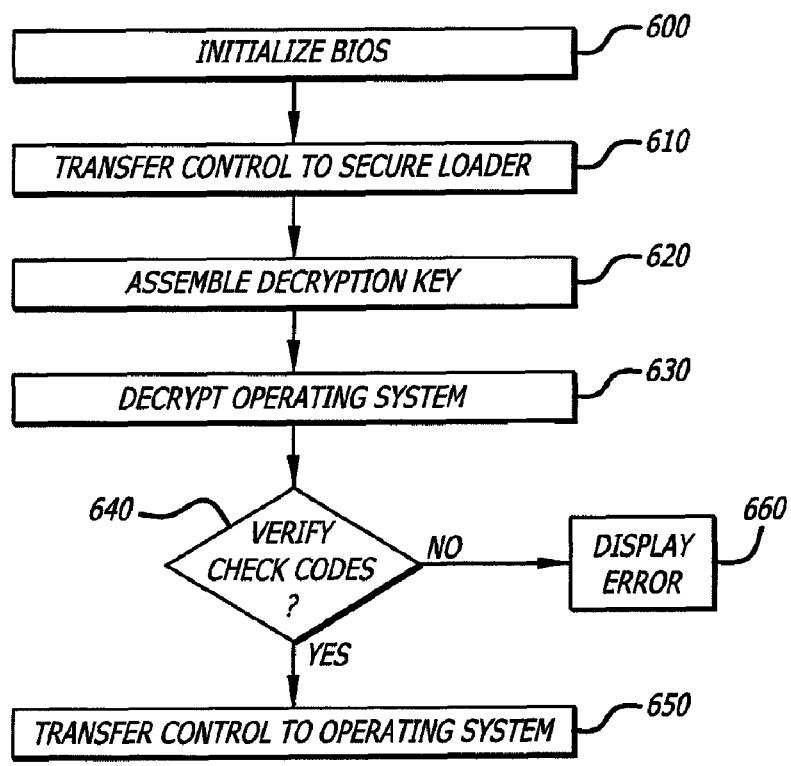
FIG. 6 is a flow chart of one embodiment of verifying an operating system of a gaming device, wherein check codes are used in verifying a decryption process.

Referring now to FIGS. 6-9, there are shown various embodiments of verifying the encrypted operating system obtained from the ROM BIOS 100. More specifically, in FIG. 6, there is shown an embodiment of a logic flow diagram of a verification method. First, on bootup or restart, the BIOS 102 is initialized (step 600). In one embodiment, the BIOS 102 performs an integrity check of itself using a checksum algorithm. If the BIOS 102 is valid, control is transferred to the secure loader 104 (step 610). Next, the secure loader 104 assembles the partitioned and scattered decryption key 108a, 108b, 108c, 108d, 108e into the decryption key 108 (step 620). In the embodiment of FIG. 6, the partitioned and scattered decryption key 108a, 108b, 108c, 108d, 108e is stored as a plaintext.

In another embodiment, the plaintext decryption key 108 is a public key of a public key security model. Accordingly, the public key would be used in decrypting a signed symmetric decryption key. The resulting plaintext version of the symmetric decryption key would then be used to decrypt the encrypted operating system 106, thereby yielding the plaintext version of the operating system 106.

Referring again to the embodiment of FIG. 6, the secure loader 104 causes the encrypted operating system 106 to be decrypted (step 630). In order to verify that the decryption of the encrypted operating system 106 was performed correctly and that there has been no corruption, the secure loader 104 causes one or more check codes 114a, 114b, 114c to be verified (step 640). For example, the check codes 114a, 114b, 114c can be assembled into a predetermined passphrase, such as "Verified by gaming device CC-16:243,705." In another embodiment, the check codes 114a, 114b, 114c are apparently random characters that are compared against known trusted values.

Should the verification of the check codes 114a, 114b, 114c of step 640 fail, then an error is displayed (step 660). Furthermore, the gaming device can be locked until an attendant of the gaming establishment resolves the pending issue. By denying access to data stored on the ROM 100, various assets can be protected. For example, the assets may include a gaming device's personality, player tracking history, funds in the gaming machine, configuration files, and a multimedia file for causing the display of an attraction sequence.

Once the check codes 114a, 114b, 114c are positively verified (step 640), the secure loader 104 transfers control to the operating system 106. Transferring control from a secure loader 104 to an operating system 106, wherein both originate from a single ROM 100, minimizes potential risks associated with transferring control among programs originating from a plurality of vulnerable components. At this point, verification of the operating system 106 and secure loading is complete.

Figure 7:
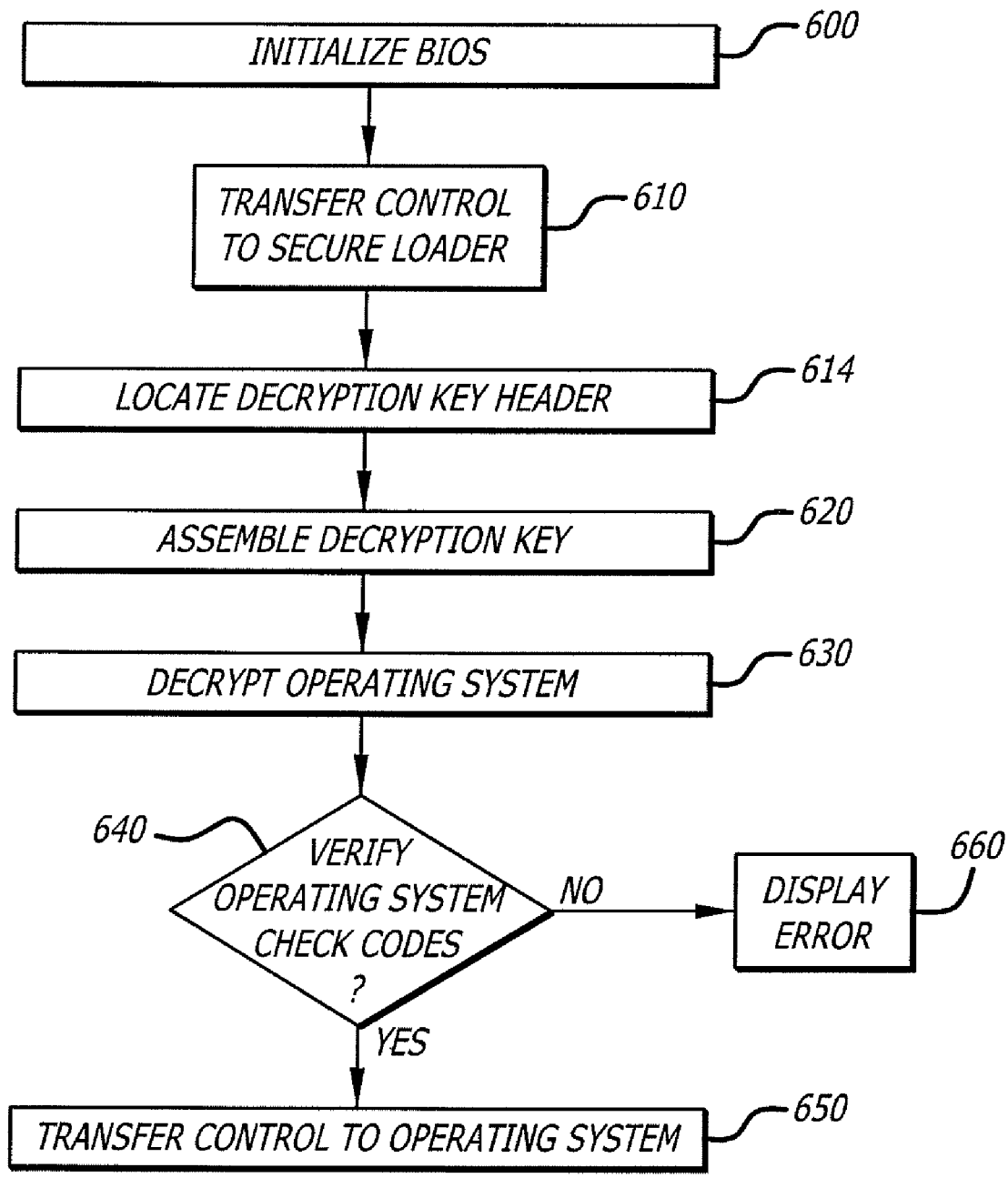
FIG. 7 is a flow chart of another embodiment of verifying an operating system of a gaming device, wherein a secure loader locates a header of a steganographically hidden decryption key.

Referring now to FIG. 7, there is shown a logic flow diagram of another embodiment of a verification method. First, upon bootup or restart, the BIOS 102 is initialized (step 600). Next, the BIOS 102 transfers control to the secure loader 104 (step 610). In the embodiment of FIG. 7, the decryption key 108 is steganographically hidden among the secure loader 104. In order to assemble the parts 108a, 108b, 108c, 108d, 108e of the decryption key 108, the secure loader 104 locates a header of the decryption key 108 (step 614). More specifically, the secure loader 104 locates the header (not shown) of the decryption key 108 based on the knowledge of the location of the hidden header in addition to knowledge of a password and/or key.

Next, the secure loader 104 assembles the steganographically hidden decryption key 108a, 108b, 108c, 108d, 108e into the decryption key 108 (step 620). With the decryption key 108, the secure loader 104 causes the encrypted operating system 106 to be decrypted (step 630). Following the decryption, the check codes 114a, 114b, 114c of the operating system 106 are verified (step 640). If the verification fails, then an error is displayed (step 660). If the verification passes, then control is transferred from the secure loader 104 to the operating system 106 (step 650).

Figure 8:
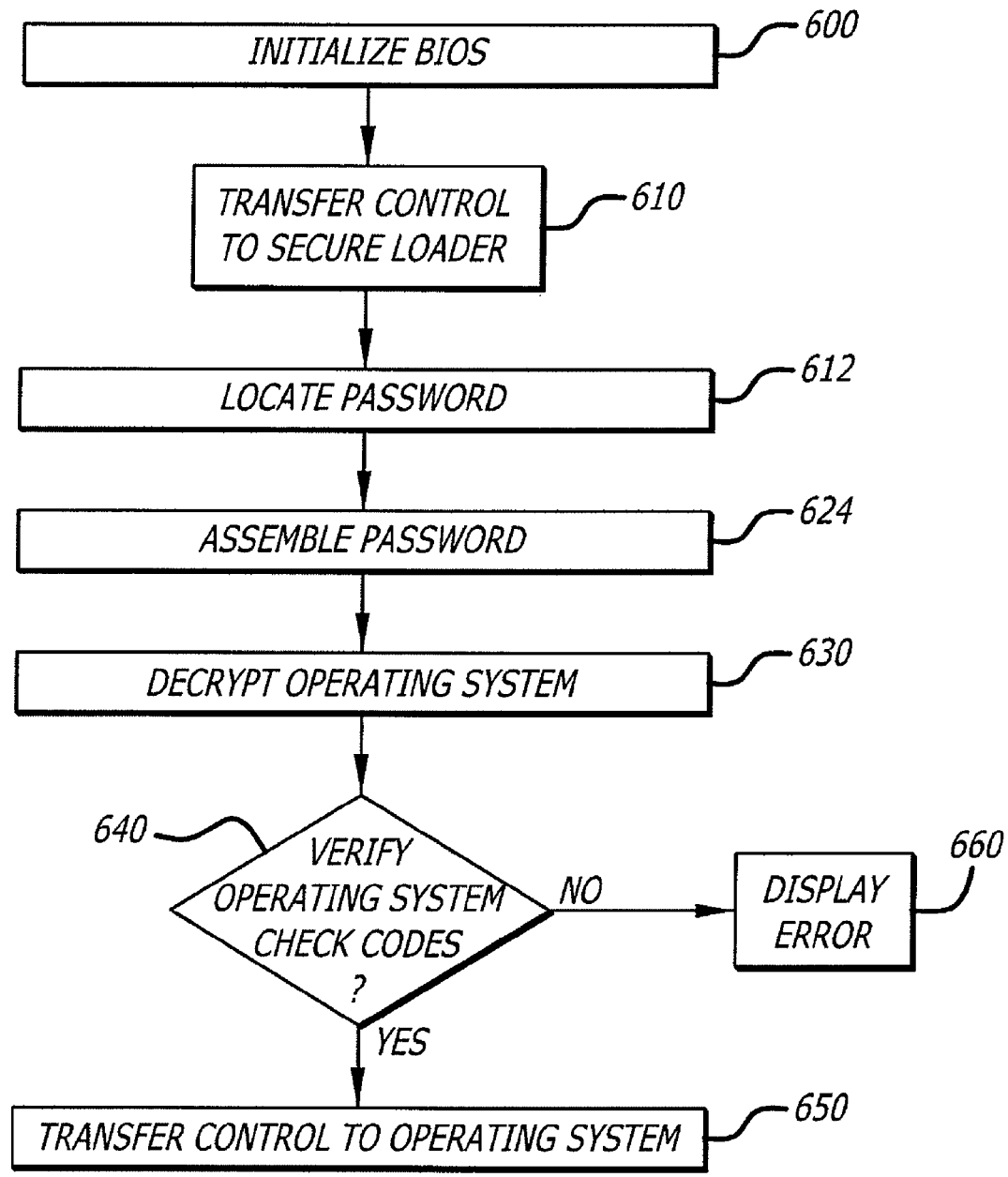
FIG. 8 is a flow chart of another embodiment of verifying an operating system of a gaming device, wherein a password scheme is employed.

Referring now to FIG. 8, there is shown a logic flow diagram of another embodiment of a verification method. First, upon bootup or restart, the BIOS 102 is initialized (step 600). The BIOS 600 transfers control to the secure loader 104 (step 610). In the embodiment of FIG. 8, the operating system 106 is encrypted using a password based technique. Accordingly, a password for enabling the decryption is partitioned and scattered about the secure loader 104.

The secure loader 104 then locates the individual portions of the password (step 612) and assembles the password (step 624). Using the password, the secure loader 104 causes the operating system 106 to be decrypted (step 630). Next, the check codes 114a, 114b, 114c dispersed about the software modules 112a, 112b, 112c are verified (step 640). If the verification fails, then an error is displayed (step 660). If the verification passes, then control is transferred from the secure loader 104 to the operating system 106 (step 650).

Figure 9:
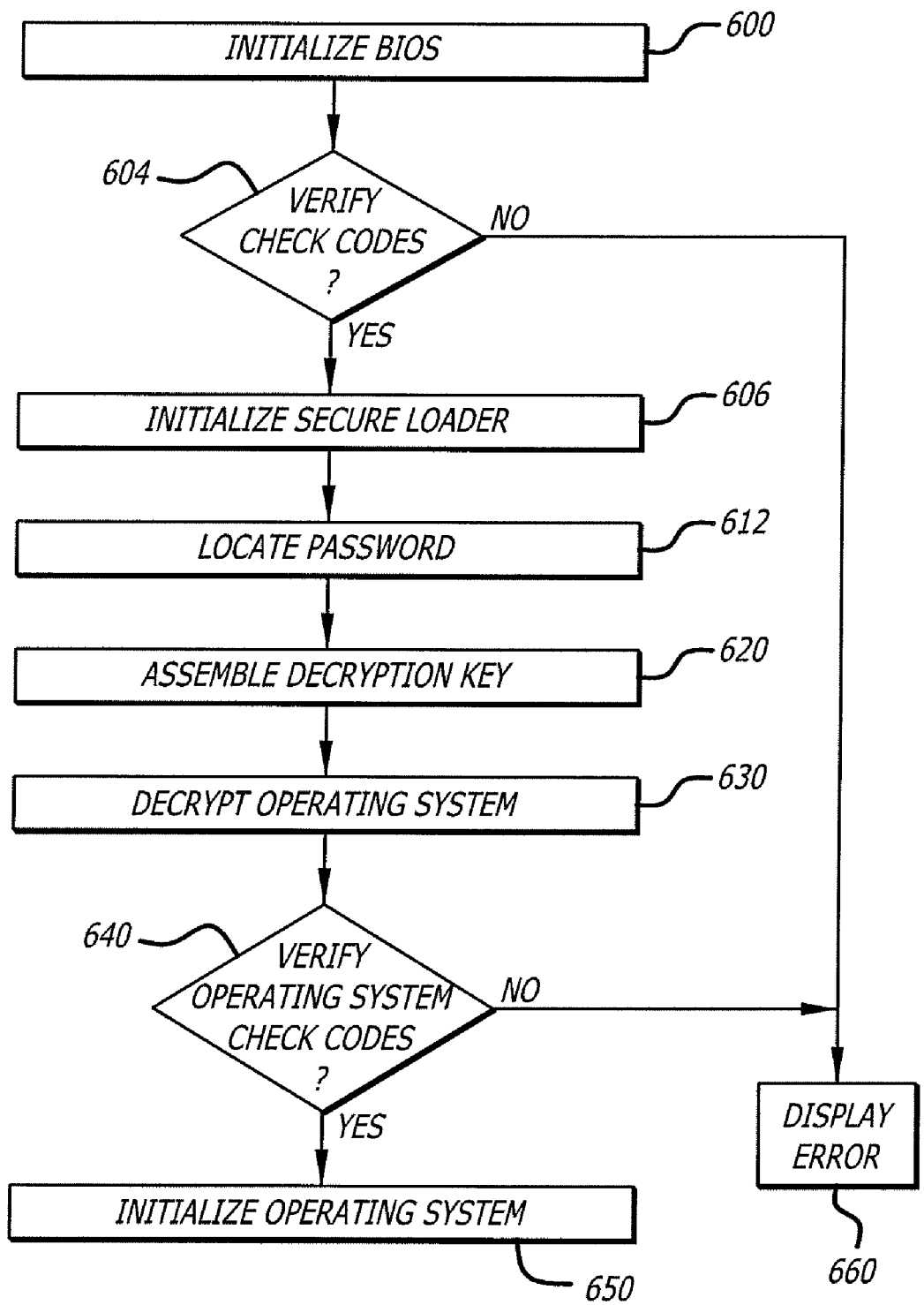
FIG. 9 is a flow chart of another embodiment of verifying an operating system of a gaming device, wherein check codes are verified to determine data integrity of information copied from a ROM to a RAM.

Referring now to FIG. 9, there is shown a logic flow diagram of yet another embodiment of a verification method. First, upon bootup or restart, the BIOS 102 is initialized (step 600). In order to determine data integrity of information copied from the ROM 100 to a main memory RAM (not shown), a plurality of check codes 110a, 110b, 110c are verified (step 604). In the embodiment of FIG. 9, the check codes 110a, 110b, 110c are dispersed about the secure loader 104. Furthermore, the check codes 110a, 110b, 110c are unrelated to both the secure loader 104 and the operating system 106. If the verification of the check codes 110a, 110b, 110c fails, then an error is displayed (step 660). If the verification of the check codes 110a, 110b, 110c passes, then control is transferred from the BIOS 102 to the secure loader 104 and the secure loader is initialized (step 606).

Following initialization (step 606), the secure loader 104 locates a password in order to access steganographically hidden information (step 612). With the located password, the secure loader 104 assembles the steganographically hidden decryption key 108 (step 620). Using the decryption key 108, the secure loader 104 causes the encrypted operating system 106 to be decrypted (step 630). Next, the check codes 114a, 114b, 114c dispersed about the software modules 112a, 112b, 112c are verified (step 640). If the verification fails, then an error is displayed (step 660). If the verification passes, then control is transferred from the secure loader 104 to the operating system 106 (step 650). Once control is transferred to the operating system 106, the operating system 106 has the functionality to verify and/or authenticate a variety of gaming software and data as part of a trusted authentication model.

One of ordinary skill in the art will appreciate that not all gaming devices have all these components and may have other components in addition to, or in lieu of, those components mentioned here. Furthermore, while these components are viewed and described separately, various components may be integrated into a single unit in some embodiments.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A method of verifying an operating system of a gaming device, the method comprising:
    initializing a BIOS stored in a first ROM of the gaming device;
    initializing a secure loader stored in the first ROM responsive to a command by the BIOS, wherein scattered partitions of a decryption key are steganographically hidden about the secure loader;
    transferring control from the BIOS to the secure loader;
    locating the decryption key stored in scattered portions about the secure loader;
    decrypting an encrypted operating system with the decryption key, thereby yielding the operating system;
    verifying a plurality of check codes responsive to decrypting the encrypted operating system, wherein the plurality of check codes are dispersed about the operating system, wherein the check codes are unrelated to the operating system; and
    transferring control from the secure loader to the operating system responsive to verifying the plurality of check codes.

2. The method of claim 1, wherein the BIOS and the encrypted operating system are at a root level of trust for an authentication trust model of the gaming device.

3. The method of claim 2, wherein the first ROM is a trusted ROM.

4. The method of claim 2, wherein the secure loader has access to a password for locating the scattered partitions of the decryption key.

5. The method of claim 4, wherein the password enables the secure loader to locate a header of the scattered partitions of the decryption key.

6. The method of claim 5, wherein the header enables identification of an inode map for the scattered partitions of the decryption key.

7. The method of claim 1, further comprising denying access to an external device to an asset of the operating system responsive to a verifying failure.

8. The method of claim 7, wherein the asset is a multimedia file.

9. The method of claim 1, wherein the encrypted operating system is stored on a secondary device and not the first ROM.

10. The method of claim 1, wherein the plurality of check codes are dispersed about the operating system noncontiguously.

* * * * *